April 27, 1965  G. B. ALEXANDER ETAL  3,180,727
COMPOSITION CONTAINING A DISPERSION-HARDENING PHASE
AND A PRECIPITATION-HARDENING PHASE
AND PROCESS FOR PRODUCING THE SAME
Filed Feb. 20, 1962
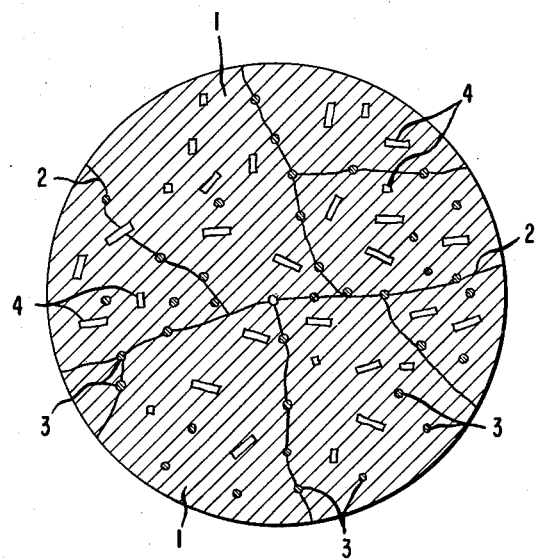
INVENTORS
GUY B. ALEXANDER
RALPH K. ILER
SHERWOOD F. WEST
BY
*Fred C. Carlson*
ATTORNEY United States Patent Office 3,180,727
Patented Apr. 27, 1965

3,180,727
COMPOSITION CONTAINING A DISPERSION-HARDENING PHASE AND A PRECIPITATION-HARDENING PHASE AND PROCESS FOR PRODUCING THE SAME
Guy B. Alexander, Ralph K. Iler, and Sherwood F. West, Brandywine Hundred, Del., assignors to E. I. du Pont de Nemours and Company, Wilmington, Del., a corporation of Delaware
Filed Feb. 20, 1962, Ser. No. 174,437
8 Claims. (Cl. 75—134)

This invention relates to improving the high-temperature properties of metals by incorporating therein a dispersion-hardening phase and a precipitation-hardening phase, and is more particularly directed to such improved metal compositions comprising (1) a continuous phase of a metal, said metal having a melting point above 600° C. and an oxide with a free energy of formation ($\Delta F$) at 27° C. of from 35 to 103 kilocalories per gram atom of oxygen in the oxide, in which there is dispersed both (2) from 0.5 to 30% by volume of a discontinuous phase of submicron, refractory metal oxide particles having a $\Delta F$ at 1000° C. greater than 99, and (3) from 0.05 to 80% by volume of submicron, precipitated particles of a substance selected from the group consisting of metal carbides, borides, nitrides, silicides, aluminides and titanides, and boron nitride and carbide, the oxygen content of the composition in excess of that present in the said refractory oxide particles being less than 0.5% and preferably less than 0.1% by weight, and is further particularly directed to processes for producing the compositions, said processes comprising (1) preparing a dispersion of from 0.5 to 30% by volume of the refractory oxide particles in the metal to be improved, this dispersion being in powder form and having an excess oxygen content less than 0.5% by weight, based on the total ultimate weight of the composition to be produced, (2) mixing the dispersion powder with the components of the precipitate phase to be formed in the metal, the proportions of said precipitate phase being from 0.05 to 80% by volume, (3) heating the mixture to a temperature, $T_1$, higher than the solvus temperature, $T_s$, of the precipitate phase and holding at temperature $T_1$ until the components of the precipitate phase have passed into solution, (4) cooling the solution to a temperature $T_2$, which is at least 200° C. lower than $T_s$, in less than one-hundred seconds, and (5) aging the so-obtained product at a temperatore, $T_a$, which is up to 80% of $T_s$ in degrees absolute.

In the drawing a fanciful representation of a metal product of the invention is illustrated, showing in cross section a matrix metal 1 having grain boundaries 2 and containing submicron refractory metal oxide particles 3 and submicron precipitate particles 4. Dimensions shown are not necessarily to scale and the shapes and numbers of particles are illustrative only.

In our prior application Serial No. 93,267, of which this application is a continuation-in-part, we have described metal compositions in which a dispersed, discontinuous refractory metal oxide particle phase is present in a continuous phase of a so-called "inactive" metal and bonding of said metal to the refractory oxide is increased by having present in the continuous phase an "active" metal. Active metals are those having an oxide irreducible by hydrogen below 1000° C. and a $\Delta F$ at 27° C. greater than 88; inactive metals are those having an oxide which can be reduced by hydrogen below 1000° C. and which has a $\Delta F$ at 27° C. less than 88. The effect of the increased bonding is to make possible the maintenance of an adequate degree of dispersion of the refractory oxide particles, even when the continuous metal phase is molten, so that casting becomes available as a means of fabrication of the metal product.

The composition claims of the prior application Serial No. 93,267 are directed to dispersions of the refractory oxide in the continuous metal phase without regard to the manner in which the active and inactive metals are disposed, relative to each other, in the metal phase. The claimed compositions have improved high-temperature properties by reason of the fact that the refractory oxide is kept well dispersed by the presence of the active metal.

Now according to the present invention it has been found that the high-temperature properties of certain metals, which have already been improved by inclusion of dispersed refractory oxide particles, can be still further improved by precipitating therein submicron particles of certain metallides, among which are included some of the metallides formable from the inactive and active metals of the prior application Serial No. 93,267, such as copper aluminide. The further improvement so effected is in magnitude more than a matter of degree, and from considerations known to the art this synergistic effect resulting from having both a dispersion-hardening phase and a precipitation-hardening phase in the continuous metal phase is entirely unexpected. Moreover, the processes whereby the novel compositions are made require control of a number of critical conditions within limits and in a manner not hitherto apparent.

PREPARING THE DISPERSION-HARDENED METAL

In producing a composition of the present invention the first step is to prepare a dispersion of suitable refractory metal oxide particles in a metal. Such procedures have already been described in our above-identified prior application and also in our Patent 2,972,529, issued February 21, 1961, and in Alexander, Yates and West U.S. Patent 2,949,358, issued August 16, 1960, and any of the processes therein described can be used.

The refractory oxide particles dispersed in the metal will herein sometimes be referred to as "the filler." "Filler" is not used to mean an extender or diluent; rather, it means an essential constituent of the novel compositions which contributes new and unexpected properties to the metalliferous product. It must have certain characteristics to give the desired effects. It must be refractory—that is, it must not melt in the molten metal to which it is added—and in general, should have a melting point above 1000° C. It should not sinter or be soluble to any substantial degree in the metal to which it is to be added. The art is familiar with refractories generally, and one skilled in the art will have no trouble recognizing a refractory answering the above description.

The ultimate particles in the filler must be in the submicron range and preferably have an average dimension in the range of 5 to 500 millimicrons. Because there is a considerable difference of density in various refractories the size of the refractory particles is aptly defined in terms of a density and surface area per unit weight. The refractory particles used should have a specific surface area in the range of 6/D to 1200/D square meters per gram, where D is the density of the particles in grams per milliliter. In the case of spheroids, this corresponds to particles having a diameter of from 5 to 1000 millimicrons. Below 5 millimicrons, it is difficult to obtain dispersions of the particles in metals because of a tendency to sintering. Particles larger than 1000 millimicrons produce brittleness in the metal product and also do not lead to development of the desired physical properties in the final metal mixture. Particles having a surface area in the range of 600/D to 24/D square meters per gram are especially preferred.

The finely divided refractory can be in the form of either crystalline or amorphous particles. The particles can be spherical, particularly in the case of amorphous materials, or they can have specific crystalline shapes—for example, cubes, fibers, platelets and other shapes. In the case of fibers and plate-like materials, unusual and beneficial results can be obtained due to the shape factor of the particles. For instance, fibers and platelets cause the molten metals to become very highly viscous at considerably lower volume loadings than are necessary with spheroids or cubes. On the other hand, to lower the density of a metal like tungsten, one uses a high volume loading of a low-density filler such as alumina particles.

When the size of a particle is given in terms of a single figure, this refers to an average dimension. For spherical particles this presents no problem but with anisotropic particles the size is considered to be one third of the sum of the three particle dimensions. For example, a fiber of alumina might be 500 millimicrons long but only 10 millimicrons wide and thick. The size of this particle would be $$\frac{500+10+10}{3}$$

or 173 millimicrons, and hence within the submicron required limit.

The particles can be discrete, individual particles in the submicron range, or they can be aggregates of smaller ultimate particles. Thus, for instance, in the case of thoria, aggregates up to 500 millimicrons in size can be made up of ultimate spheroidal particles—say, 17 millimicrons in diameter. Aggregates even larger than 1000 millimicrons can be used as starting materials, the important consideration being the ease with which ultimate particles less than 1000 millimicrons in size are formed during the process.

A refractory oxide, to be suitable in the compositions of this invention, should be relatively non-reducible—that is, it should not be reduced to the corresponding metal by hydrogen at temperatures below 1000° C. or by the metal in which it is embedded.

The free energy of formation of metal oxides at a specified temperature is an indication of the refractory properties, $\Delta F$ being expressed as kilocalories per gram atom of oxygen in the oxide. The refractory oxides used according to the present invention must have a $\Delta F$ at 1000° C. which is above 99. Mixed oxides, especially those in which each oxide has the characteristics above stated, can be used. Thus, the term "metal oxide filler" broadly includes spinels, such as $MgAl_2O_4$ and $CaAl_2O_4$, and metal aluminates. Typical single oxides which are useful as the filler include alumina, magnesia, hafnia, and the rare earth oxides including thoria. A typical group of suitable oxides and their free energies of formation is shown in the following table.

Oxide: $\Delta F$ at 1000° C.
- $Y_2O_3$ — 125
- $CaO$ — 122
- $La_2O_3$ — 121
- $BeO$ — 120
- $ThO_2$ — 119
- $MgO$ — 112
- $UO_2$ — 105
- $HfO_2$ — 105
- $ClO_2$ — 105
- $Al_2O_3$ — 104
- $ZrO_2$ — 100

The continuous metal phase in which the refractory oxide is dispersed in a metal or alloy of two or more metals at least one of which has a melting point above 600° C. and a $\Delta F$ at 27° C. of from 35 to 103. It will be seen that this category of metals includes some metals which have previously been considered "active" and also some which have previously been classified as "inactive."

The following tabulation shows metals having an oxide, the $\Delta F$ of which is within the specified range from 35 to 103:

| Metal | Oxide | $\Delta F$ of Oxide at 27° C. |
|---|---|---|
| Copper | $Cu_2O$ | 35 |
| Rhenium | $ReO_3$ | 45 |
| Nickel | $NiO$ | 51 |
| Cobalt | $CoO$ | 52 |
| Iron | $FeO$ | 59 |
| Molybdenum | $MoO_3$ | 60 |
| Tungsten | $WO_3$ | 60 |
| Chromium | $Cr_2O_3$ | 83 |
| Manganese | $MnO$ | 87 |
| Niobium | $NbO_2$ | 90 |
| Tantalum | $Ta_2O_5$ | 92 |
| Silicon | $SiO_2$ | 98 |
| Vanadium | $VO$ | 99 |
| Titanium | $TiO_2$ | 103 |

All of the metals included in the above table have melting points above 600° C. and hence can be used as the continuous metal phase in which the refractory oxide is dispersed. It will be understood that other metals having free energies of formation outside the above range can be used in addition to and together with the tabulated metals. Zinc, for instance, can be used as an alloy with such metals as copper.

In a particularly preferred aspect of the invention the matrix metal is at least one metal selected from the group consisting of copper, nickel, cobalt, iron, molybdenum, tungsten and chromium.

The proportion of refractory oxide particles in the continuous metal phase should be in the range of 0.5 to 30% by volume, with 1 to 10% being more preferred and 1 to 5% most preferred.

In selecting a refractory oxide for use with a particular metal certain precautions should be observed. The oxide particles should be stable with respect to the metal, that is, they should have a higher free energy of formation than the oxides of the matrix metal and a melting point above that of the matrix metal. The oxide particles should also be non-reactive with the precipitate phase ultimately to be introduced. The oxygen content of the metal-metal oxide, exclusive of the oxygen in the dispersed oxide filler particles, should be low, that is, below 0.5% and preferably below 0.1%. The above-described type of refractory oxide dispersions in metals can be made, for instance, according to the processes of our above-mentioned prior applications and patent. One such method is to coprecipitate particles of the refractory oxide from a colloidal dispersion thereof, together with a hydrous oxide of the metal which is to be the continuous metal phase, dry the precipitate, and reduce the hydrous metal oxide to the corresponding metal with hydrogen or an active metal such as sodium or potassium. A reduction with active metal can, for instance, be accomplished by dispersing the hydrous oxide in a fused salt bath and adding the active metal to the melt.

The metal dispersion of refractory oxide is then converted to powder form—if necessary, by grinding or ball milling. In some methods of preparation the product will inherently be in powder form and no further grinding or other subdividing step is required at this point.

The particle size of the filled metal powder is preferably kept relatively small, that is, less than 500 microns, and can be as small as one micron. However, powder particles which have a high surface area (those in which the ultimate particles are extremely small—less than 10 microns) tend to be pyrophoric; hence, it is preferred that the surface area of the metal powder be less than 10 square meters per gram, less than 2 square meters per gram being even more preferred. The size of the powder particles preferably is in the range of from 10 to 50 microns. The size refers to the aggregate structure of the powder. The powders may be porous—that is, may have internal surface area, provided the surface area is less than 10 square meters per gram of powder.

INCORPORATING THE PRECIPITATION-HARDENING PHASE

The dispersed powder prepared as just described is according to the present invention next mixed with the components of the precipitate phase to be formed in the continuous metal phase. When reference is made to "components" it will be understood that one may employ either the substance which is ultimately to serve as the precipitate phase or may use elements or compounds which can combine in situ in the subsequent process steps to form the substance which is the ultimate precipitate phase.

To form a metal product wherein the ultimate precipitation phase is to be copper aluminide and the continuous metal phase is to be an aluminum-copper alloy, for instance, the component added can be copper, since the aluminum will combine with some of the copper to form copper aluminide during the process. Such a method is particularly well adapted to use in a melt process such as is described in Example 1 of our above-mentioned prior application Serial No. 93,267.

For any given system the precipitation phase which is selected is one in which the solubility decreases as the temperature is lowered. Thus, for example, if nickel-thoria were the metal-metal oxide composition, one might select nickel aluminide, $Ni_3Al$, as the precipitate by adding from 5 to 10% of aluminum by weight, based on the total nickel in the sample. Alternatively, titanium or carbides of tungsten, molybdenum, chromium, or niobium might be selected for nickel-base alloys. Other examples of the precipitating phase include titanium or the carbides of iron, chromium, titanium, or tungsten in iron-base alloys; aluminide in copper alloys; aluminide, titanide, or the carbides of tungsten, chromium, tantalum, or niobium in cobalt alloys.

More particularly, the precipitate can be a substance selected from the group consisting of metal carbides, borides, nitrides, silicides, aluminides, and titanides and boron nitride and carbide. It will be understood that these materials can be added as such or the elements of which they are constituted can be separately added.

Whatever the method of introducing the precipitate components the ultimate proportion of the precipitate should be in the range of 0.05 to 80% by volume, preferably from 0.5 to 60% by volume, with from 20 to 60% by volume being especially preferred.

The mixing of the dispersion powder with the components of the precipitate phase to be formed in the metal can be accomplished in various ways. In the powder-blending method the components of the precipitate phase are in powder form and are mixed with the powdered, refractory oxide-filled metal powder prepared as above described. The mixture can be compacted, sintered, worked, solution-treated, and aged. An alternative method is a melt process such as is described in detail in our above-mentioned prior U.S. application Serial No. 93,267. In this process the components of the precipitate phase are added to the melt, the melt is quenched, and is subsequently heat-aged to grow the precipitate phase.

To modify nickel which has been dispersion-hardened with thoria, for example, one can blend a nickel-thoria powder with titanium and/or aluminum powder, whereby after sintering and quenching the product will be precipitation-hardened with nickel aluminide or titanium aluminide, or one can add the nickel-aluminide or titanium-aluminide powder in an already reacted form.

THE HEATING AND QUENCHING STEPS

Now having mixed the components of the precipitation-hardening phase with the refractory-oxide, dispersion-hardened phase the next step is to bring the mixture into solution by heating above the solvus temperature. The solvus temperature, $T_s$, is determined according to conventional metallurgical procedures as follows: Small pieces (one-fourth-inch cubes) of the metal system to be examined are heated to a series of temperatures and held for three to four hours. The pieces are then quick-quenched in water, polished, and the microstructure is examined by conventional techniques for the presence of the precipitation phase. In some of the pieces no precipitate will be seen and the minimum temperature of heating at which no precipitate is seen is called the "solvus temperature."

In a process of the invention the mixture is held at a temperature, $T_1$, higher than the solvus temperature of the precipitate phase until the components of the precipitate phase have passed into solution. The fact of whether or not the various components are in solution can usually be determined easily by visual inspection, but in any event a few hours—say, three to four—of heating at temperature $T_1$ is sufficient to insure that complete solution has been achieved.

After all components of the precipitate phase are in solution the mixture is quenched. In this quenching operation the temperature to which the mixture is cooled, $T_2$, which is at least 200° C. lower than the solvus temperature, $T_s$, must be reached in a time less than one-hundred seconds. It will be understood, of course, that the quench can be very rapid and accomplished in considerably less than one-hundred seconds and that the temperature $T_2$ can be substantially more than 200° C. below the solvus temperature. For most systems water-quenching is suitable, but the art is familiar with various quenching techniques and any of these, such as oil, air-blast, or air-cool, can be used.

AGING THE PRODUCT

The quenched metal product, which now contains both the dispersed refractory oxide discontinuous phase and the discontinuous precipitate phase in the continuous metal phase, is aged at a temperature, $T_a$, which is up to the solvus temperature and usually is about 80% of the solvus temperature in degrees absolute. This aging causes the precipitate phase to grow to the desired size, which is in the range of 5 to 1000 millimicrons. When this desired size is reached, the aging treatment is discontinued. If the solvus temperature of a particular metal system, for instance, is 1000° C., equivalent to 1273 degrees absolute, the temperature of aging can be from 636 to 1018 degrees absolute or 363 to 775° C.

Representative aging treatments for particular metal systems are shown in the following tabulation.

| Metal | Precipitate Phase | Temp. $T_1$, ° C. | Aging Treatment | |
|---|---|---|---|---|
| | | | Temp., ° C. | Time, Hrs. |
| Fe | Iron titanide | 1,100 | 500 | 5 |
| Fe | Nickel titanide | 1,100 | 500 | 10 |
| Copper | Cobalt Aluminide | 1,000 | 400 | 10 |
| Do | Copper Aluminide | 1,000 | 400 | 10 |
| Nickel | Nickel Aluminide | 1,200 | 600 | 24 |
| Do | Nickel Titanide | 1,200 | 600 | 24 |
| Cobalt | Cobalt Aluminide | 1,300 | 650 | 16 |
| Do | Cobalt Titanide | 1,300 | 700 | 40 |

THE NOVEL METAL COMPOSITIONS

The novel compositions of the present invention, comprising a continuous metal phase in which there are dispersed submicron particles of both a refractory oxide and a precipitate of carbide, boride, nitride, silicide, aluminide, or titanide, have exceedingly high strength, resistance to creep particularly at elevated temperature, and resistance to oxidation. Although in this description reference is made to the continuous phase as being a single metal, it will be understood that the continuous phase can also be an alloy of two or more metals.

The precipitated filler particles present in the metal products of the present invention are dispersed throughout the metal phase. This dispersion can be demonstrated using the electron microscope and replica techniques wherein the surface of a metal piece is polished, etched, a carbon layer is deposited on the etched surface, and the metal is removed by dissolving, for example, in a bromine-ethanol solution. An electron micrograph of the remaining carbon replica shows that the filler particles are uniformly dispersed throughout the metal grains.

The electron microscope can also be used to observe the size and shape of the oxide filler particles which are also dispersed throughout the metal. In the case of oxide particles, while they sometimes may be uniformly dispersed throughout the metal matrix, there may also be volumes of metal which contain no oxide particles and other volumes in which the oxide particles are uniformly dispersed. By "uniformly dispersed" is meant that there is uniform distribution of the refractory particles within any single selected microscopic region of metal, such regions being about 10 microns in diameter.

Both the oxide filler particles and precipitated particles in a product of the invention must be in the size range of 5 to 1000 millimicrons, preferably should be from 5 to 500 millimicrons, and still preferably from 10 to 250 millimicrons.

Among the substances preferred as the precipitate phase in products of the invention are included the carbides of silicon, titanium, zirconium, hafnium, niobium, tantalum, chromium, moylbdenum, tungsten, boron, iron, thorium and other rare earth metals, the nitrides of boron, silicon, titanium, zirconium, hafnium, cerium, the other rare earths, and other transition metals, the transition metal borides, and the silicides, aluminides, and titanides of copper, iron, cobalt, chromium, manganese, molybdenum, rhenium, vanadium, niobium, tantalum, hafnium, titanium, zirconium and tungsten. In describing products of this invention the oxide filler particles have been referred to as single, coherent masses of metal surrounded by metal and separated from other oxide mass by metal. The particles can, of course, be aggregates of smaller ultimate units which are joined together to form a structure, but in this event the size of the aggregate must be less than 1000 millimicrons.

Because the oxide particles are substantially completely surrounded by a metal coating which maintains them separate and discrete they do not come in contact with one another and thus coalescence and sintering of the oxide filler material is prevented.

Metal compositions in which the oxide filler is thoria, beryllium oxide, magnesium oxide, calcium oxide, or rare earth oxide, or a mixture of oxides of the rare earth elements of the lanthanum and actinium series have exceptional stability in elevated-temperature tests such as stress rupture and creep tests, and hence are preferred embodiments of the invention. These materials maintain their properties to a considerably greater extent than metals filled with silica, for example, even when the initial hardness obtained during the processing operation is similar. The reason for this improvement is related to the free energy of formation of the filler. For this reason, preferred compositions of the invention for use at very high temperatures—say, above 1000° C. —comprise as the dispersed metal oxide particles refractory oxides having a free energy of formation at 1000° C. greater than 99 kilocalories per gram atom of oxygen in the oxide. Even more preferable are those having a $\Delta F$ of from 115 to 123 kilocalories.

In compositions of the invention prepared by powder metallurgy the finely divided oxide filler particles cause the grain size of the metal in the vicinity of the oxide filler to be much smaller than is normally the case. This small grain size persists even after annealing the product at temperatures in degrees absolute up to 0.8 times that of the melting point of the products. A grain size below 10 microns, and even below 2 microns, is common for the powder-metallurgy products of the invention. Products which have filler particles in contact with metal grains in the size range below 10 microns are preferred.

Another preferred species of the products of the invention comprises a continuous metal matrix in which the oxide filler particles are non-uniformly dispersed and in which the precipitated particles are uniformly dispersed. These products are also made by powder metallurgy. The metal grains in the volumes containing the oxide particles are less than 10 and preferably less than 2 microns in size. In regions which are free of oxide particles the grain size may be 40 microns, or even larger. These products are sometimes referred to as products having an "island structure." While the term "island structure" is useful to convey the concept of heterogeneous character found in the solid product of this aspect of the invention, it can also be a misnomer in some instances. For example, there will always be areas (or more accurately, volumes) of refractory oxide-filled metal intermingled with areas (or volumes) of metal containing no oxide particles and it is immaterial which is the island and which is the matrix. This will depend upon which component is present in the predominate proportion— that is, the component containing oxide filler particles or the component containing no such particles. The products having volumes of metal containing no oxide filler are more ductile than those in which the filler is uniformly dispersed throughout the composition. It is believed that this is because in those volumes in which there are no filler particles the metal grains grow to a much larger size, such as 40 microns and larger.

In the island-structured metal products the size and shape of the filled and unfilled areas can vary over wide limits. The characteristics of size and shape are a result of the size and shape of the metal powders from which the structures were prepared, as well as the compacting, sintering, working, and annealing steps used in the preparation.

A preferred class of products of the invention consists of high-melting compositions, containing in the continuous metal phase at least one metal from the group consisting of iron, cobalt, nickel, molybdenum, and tungsten. These products are especially notable for their very high strengths at high temperatures such as above 1500° F.

A specifically preferred class of the novel products consists of alloys containing chromium. These alloys are surprisingly oxidation resistant. Because they have high-temperature strength by reason of the inclusion of the refractory oxide filler and precipitated filler particles, they are useful at elevated temperatures, for instance, in the range of 1200 to 1900° F. and in some cases even higher. Stainless steel alloys are included in this preferred class. They can be prepared from nickel-iron masterbatches containing refractory oxide fillers such as thoria by a process in which the masterbatch is blended with carbon, chromium, nickel, and iron powders. In a similar manner, one can make other alloys of chromium such as 80 Ni–Cr 20, containing thoria as the refractory oxide and nickel aluminide and/or nickel titanide as the precipitate phase. Of this group, iron, nickel, and cobalt alloys containing from 10 to 25% chromium are especially preferred. Specifically, such alloys containing 90 to 50% of the sum of iron, cobalt, and nickel, 0 to 20% of the sum of molybdenum and tungsten, and 0 to 5% manganese, silicon and niobium, along with 10 to 25% chromium are particularly preferred.

In the above-mentioned chromium alloys, and other high-temperature alloys, it is preferred to use very stable refractory oxide fillers—that is, the fillers with a high free energy of formation such as beryllia, calcia, thoria and rare earth oxides. These fillers have a free energy of formation at 1000° C. of more than 115 kilocalories per gram atom of oxygen in the oxide. Oxides having a free energy of formation at 1000° C. of up to 123 are presently available, and if more stable oxides could be prepared, they would be included in this class. These oxides are preferably used together with a precipitate phase selected from metal titanides, aluminides, and carbides.

Preferred for use at maximum temperatures are alloys in which the continuous phase contains metals having the highest melting points, such as niobium, tantalum, molybdenum, or tungsten, or two or more of these metals. Since molybdenum and tungsten do not have maximum oxidation resistances, these metals are ordinarily not used alone but are useful in alloys with other metals. Alloys of tungsten and molybdenum with other metals such as nickel, iron, cobalt, chromium, titanium, zirconium, niobium, aluminum, and silicon are especially useful. This preferred group includes such alloys as high-molybdenum steel, nickel-molybdenum steel, molybdenum-iron-nickel alloys, and tungsten-chromium and molybdenum-chromium alloys. Within this class also are alloys of molybdenum or tungsten with niobium or titanium or with both niobium and titanium. Molybdenum-titanium alloys, containing 10 to 90% titanium are included in this group as are molybdenum-niobium and tungsten-niobium alloys. The latter alloys can be conveniently prepared by the powder blending process above described, using a molybdenum-filler masterbatch blended with niobium metal powder and a precipitate-forming phase.

Products of the invention in which the precipitate phase is a metal aluminide are also especially useful. Aluminum forms intermetallic compounds which are light in weight and oxidation resistant. To make a product of this type one can, for example, add a lanthana-nickel masterbatch to powdered aluminum, thereby obtaining aluminum-nickel-lanthana compositions. Similarly, one can prepare aluminum-copper alloys, aluminum-nickel-cobalt alloys, aluminum-iron alloys, and alloys containing both aluminum and molybdenum.

UTILITY OF THE PRODUCTS

The metal products of this invention are especially useful for fabrication into components which must maintain dimensional stability under heavy stress at high temperature. By "high" temperatures is meant temperatures in the range of from 0.5 to 0.8 times the melting temperature, in degrees absolute, of the metal in the composition.

Metal products of the type above described for use at extremely high temperatures can be used, for instance, in making blades for gas turbines. Such blades operate under extreme temperature gradients. The tip sections, and the vanes co-operative therewith, are at maximum temperatures which are so high as to tax the capabilities of the most heat-resistant metals hitherto known. The root sections, on the other hand, operate at relatively lower temperatures, but must bear the highest stresses. The modified metals of the present invention are ideally suited for such uses as in gas turbines because they have maximum strengths, as compared with other metals, both at highest temperatures and at intermediate temperatures. It is believed that this high-temperature capability is primarily attributable to the presence of the dispersed refractory oxide particles, and that the extreme strength at intermediate temperatures is primarily attributable to the precipitate phase, but it is also evident that there is a co-operation between these aspects to give metal products having useful properties unexpected from a consideration of each of these aspects separately.

EXAMPLES

The invention will be better understood by reference to the following illustrative examples.

Example 1

This example describes the application of a process of the invention to the preparation of an alloy of copper and aluminum containing alumina ($Al_2O_3$) as the dispersed refractory oxide and copper aluminide as the dispersed precipitate phase.

The first step in the preparation of this alloy was to prepare a dispersion of colloidal alumina in copper metal. This was done by diluting 652 parts by weight of a 5% solution of colloidal alumina monohydrate fibrils having a specific surface area of about 300 square meters per gram, and a fiber length of about 250 millimicrons, to a total volume of 5 liters with distilled water. Separately, 2370 grams of copper nitrate trihydrate was dissolved in 5 liters of distilled water, and 3600 cubic centimeters of a 5 N ammonium hydroxide solution was diluted to a volume of 5 liters. These three solutions were run simultaneously and at equal rates into the mixing zone of a reactor equipped with a high-speed stirrer. By means of this technique, the colloidal alumina was evenly dispersed throughout a matrix of copper hydroxide.

The precipitated copper hydroxide containing the dispersed colloidal alumina was filtered, washed, and reduced in a tube furnace with hydrogen, until substantially all of the oxygen from the copper hydroxide was eliminated. Analysis of the resulting reduced metal powder containing dispersed colloidal alumina within it showed that the sample consisted of 88.7% copper and 9.7% $Al_2O_3$, this corresponding to a loading of 19.6% by volume of $Al_2O_3$ in the copper.

A portion of this material was dissolved in acid and electron micrographs were run on the resulting solution after dialyzing out the acids and salt left by the dissolution of the copper. The electron micrographs showed that the particles were still of colloidal size, and a nitrogen surface area run on some dry powder recovered by this technique indicated that the mean particle diameter was about 30 millimicrons.

This copper powder was used to prepare a copper-aluminum alloy which had the composition of the commercial alloy known as 24S alloy. This alloy has 4.5 parts of copper, 1.5 parts of magnesium, 0.6 part of manganese, and 93.4 parts of aluminum. The experimental alloy was of identical composition, except for the alumina contained inside the copper powder.

The metal components of this alloy were melted and brought to a temperature of 815° C. and maintained in the molten state for a period of thirty minutes. The mixture was then air quenched and extruded into rods approximately one-fourth inch in diameter, from an initial size of one-inch diameter. This extrusion was accomplished at a temperature of about 450° C. The alloy was then given a solution heat treatment in the temperature range of from 488° C. to 499° C. for a period of three hours. It was then quenched in cold water and precipitation-hardened at room temperature over a period of three days. This cycle of heat treatment corresponds to the so-called T–4 condition. During this sequence of operations precipitation hardening occurred by reason of the combining of some of the copper and aluminum in situ as copper aluminide.

The tensile strength of this alloy was tested at a temperature of 600° F. and was shown to be 24,000 p.s.i. A commercial alloy of the same composition but containing no alumina has a tensile strength of about 7,000 p.s.i. at this temperature. This example shows the considerable improvement in tensile strength which can be brought about by the inclusion of only 0.7 volume percent of a colloidal alumina in an alumina-copper alloy.

Example 2

A solution of nickel nitrate was prepared by dissolving 4362 grams of nickel nitrate hydrate, $Ni(NO_3)_2 \cdot 6H_2O$, in water and diluting this to 5 liters. A thoria sol was prepared by dispersing calcined thorium oxalate, $Th(C_2O_4)_2$, in water containing thorium nitrate. The thoria in this sol consisted of substantially discrete particles having an average diameter of about 5 to 10 millimicrons. A 58-gram portion of this colloidal aquasol (26% $ThO_2$) was diluted to 5 liters.

To a heel containing 5 liters of water at room temperature, the solution of nickel nitrate, the diluted thoria sol, and ammonium hydroxide-ammonium carbonate solution were added as separate solutions, simultaneously and at uniform rates, while maintaining good agitation, whereby precipitation of the nickel and thoria was effected. During the precipitation, the pH in the reactor was maintained at 7.5. A precipitate of nickel hydroxide-carbonate was thus deposited around the thoria particles. The resulting mixture was filtered, and washed to remove the ammonium nitrate. The filter cake was dried in an oven at 300° C.

The product obtained was pulverized in a hammermill to pass 325 mesh, placed in a furnace, and heated to a temperature of 500° C. Hydrogen was slowly passed over the powder at such a rate that sufficient hydrogen was added to the nickel oxide theoretically to reduce it in a period of four hours. The flow of hydrogen was maintained at a steady, uniform rate during this reduction procedure for eight hours. Thereafter, the temperature was raised to 700° C. and the flow of dry, pure hydrogen was greatly increased, and finally the temperature was raised to 900° C. to complete the reduction and to sinter the reduced powder.

The resulting powder had a surface area of 4 square meters per gram and a bulk density of 2.3 grams per milliliter. The powder contained 2% $ThO_2$ by volume.

Ninety-three parts of the thoria-nickel powder were blended with seven parts of aluminum powder as a component to react with some of the nickel powder to form a nickel aluminide phase during subsequent processing. The blended powder was then passed hydraulically at 30 tons per square inch to a billet one inch in diameter and two inches long.

The billet was next sintered in very pure hydrogen (completely free of oxygen and nitrogen and having a dew point below −70° C.) for twenty hours at 550° C. and five hours at 1200° C.

The sintered billet was then heated to 2200° F., dropped into a container at 1100° F., and then extruded from the container through a die having a 90-degree throat, to a one-fourth inch rod. Thus, hot working was carried out at temperatures high enough to achieve solution treatment. The extruded rod was heat aged at 600° C. for twenty-four hours.

The strength of the nickel-nickel aluminide-thoria product was improved over that of pure nickel, nickel aluminide or nickel thoria. The improvement in 0.2% yield strength was particularly noticeable at 900 to 1500° F. Comparative data is shown in the following tabulation:

| Composition | Yield Strength (p.s.i.) | | |
|---|---|---|---|
| | 950° F. | 1,300° F. | 1,800° F. |
| Nickel | 17,000 | 8,000 | 1,500 |
| Nickel—2% | 51,000 | 11,000 | 9,000 |
| Nickel—7% Al as aluminide | 37,000 | | 5,000 |
| Nickel—2% $ThO_2$—7% Al as aluminide | 115,000 | 48,000 | 10,000 |

| | 100 Hr. Stress Rupture, p.s.i. | | |
|---|---|---|---|
| | 950° F. | 1,300° F. | 1,800° F. |
| Ni—2$ThO_2$ | 11,000 | 8,000 | 4,000 |
| Ni—2$ThO_2$—7 Al | 40,000 | 11,000 | 4,200 |

Another improvement by which the product of this example is characterized is that of oxidation resistance. The oxidation rate at 1800° F. in air, as measured by gain in weight, is slower for the product of this example than for a wrought nickel, unmodified control. Similarly the depth of penetration of attack after oxidation at 1800° F. is considerably smaller than that of wrought nickel.

An electron micrograph picture was prepared to show the distribution of thoria and nickel aluminide in the thoria-nickel-nickel aluminide sample. The micrograph showed that there were regions in which there was a homogeneous distribution of thoria in the nickel. Within these areas there were nickel aluminide particles also homogeneously dispersed.

The electron micrographs were prepared as follows: A one-fourth-inch rod of nickel containing dispersed thoria and nickel aluminide was cut and the cross section was mounted in Bakelite and mechanically polished. The polished surface was cleaned and dried in ethyl alcohol. The samples were electrolytically etched in 10% HCl in ethyl alcohol. After chemical etching the sample was placed in a vacuum evaporator. Two carbon rods were brought together within the evaporator and current applied until sputtering occurred. A very thin film of carbon was deposited upon the etched surface as the sputtering occurred. The carbon-covered surface was scribed into one-sixteenth-inch squares with a sharp cutting blade.

The scribed sample was placed in a culture dish containing a 1% solution of bromine. The carbon squares were freed from the surface of the metal by chemical attack. They floated to the surface of the solution, were picked up on electron microscope screens (250-mesh S/S wire), and viewed in a Phillips EM–100 three-phase electron microscope. Alternatively, samples could have been viewed as polished.

The solution of bromine was used to remove the carbon because it would attack the base metal and not do damage to the oxide, or the carbon replica.

All samples were photographed in the electron microscope at a film magnification of 1,250 times and 5,000 times, respectviely. Prints at 5,000 times were made from 1,250 times negative and at 20,00 times from the 5,000 times negative.

The presence of grain boundaries (lines) in the 20,000 times picture was plainly observable. In the areas where thoria filler particles were present, these grains averaged about 2 to 4 microns in size. The $ThO_2$ particles were about 0.1 micron in size. In the areas where there was no filler, the grain size was in the range of 50 microns and greater, or about twenty-five-fold that of the filled grains.

*Example 3*

A sample of iron powder containing 5 volume percent alumina, $Al_2O_3$, was prepared by a method similar to the process of Example 2, using a dispersion of $Al_2O_3$ in dilute $HNO_3$ in place of the $ThO_2$ sol and $Fe(NO_3)_3$ solution in place of $Ni(NO_3)_2$. The $Al_2O_3$ dispersion was prepared by slurrying a commercial $Al_2O_3$ powder in very dilute nitric acid, colloid milling and discarding the fraction which settled in a ten-inch column over a period of twenty-four hours.

The Fe–$Al_2O_3$ powder, completely free of iron oxide, was blended with carbon in an amount to give 0.3% carbon in the alloy. The blended powder was processed by hydrostatic pressing at 200,000 p.s.i., sintering for twenty hours at 1350° C., and finally extruding to a 16:1 reduction ratio at 1900° F. The extruded rod was heat aged at 800° F. for five hours.

*Example 4*

A nickel-chromium-thoria powder, containing 2 volume percent thoria, was prepared according to the teachings of Example 2. Initially, three feed solutions were used: (a) 4580 grams $Ni(NO_3)_2.6H_2O$ in 6 liters of distilled water, (b) 147 grams of 20.2% $ThO_2$ sol diluted to 6 liters, and (c) 12 liters of two-thirds-saturated $(NH_4)_2CO_3$ solution. The pH at the end of the feed additions was 7.0. Thereafter, two feed streams were added (a) 1698 grams $Cr(NO_3)_3 \cdot 9H_2O$ diluted to 6 liters and (b) 6 liters of two-thirds-saturated $(NH_4)_2CO_3$ solution. The final pH was 7.0.

The wet cake, recovered by filtration, weighed 8500 grams. It was dried at 125° C. overnight and then heated to 450° C., and micropulverized to pass 100 mesh.

Fourteen hundred thirty-two grams of the pulverized mixed oxide powder was blended with 53 grams of carbon, and the mixture placed in a reduction furnace. Clean, dry hydrogen was passed over the sample at the rate of 5 to 8 liters per minute, and the temperature was held at 500° C. for sixteen hours. The flow of hydrogen was continued, and the temperature raised to 1080° C. After seventy-two hours the dew point of the effluent hydrogen was −50° C. The furnace was cooled to room temperature and the sample removed.

The reduced Ni–Cr–$ThO_2$ powder analyzed 2.1% $ThO_2$, less than 0.01% carbon, and less than 0.01% oxygen in excess of the oxygen as $ThO_2$. This powder was blended with $Ni_3Al$ powder, 100 parts by weight of Ni–Cr–$ThO_2$ being added to 60 parts of $Ni_3Al$ powder.

The blended powder was pressed, sintered, and extruded, as in Example 2. The extruded rod was solution treated at 1200° C., quenched and then heat aged at 750° C. for sixteen hours.

*Example 5*

Excessive grain growth in metal alloys required to have high strength at very high temperatures is known to have a detrimental effect on the mechanical properties of the metal alloys. Researchers have sought to control the grain size by carbide phases which do not dissolve when the metal system is solution treated. Solution-treating temperatures are thus limited to the temperatures at which the carbide does not dissolve. Hence, for most nickel-base alloys, the alloy must be heated above 1950° F. to disolve γ′, but it must not be heated above 2150° F. lest the carbide dissolve and excessive grain growth occur.

In this example, metal specimens containing 2% of thoria and 8.0% of aluminum, both by weight, prepared by procedures described in Example 1 and in which the the aluminum was present as nickel aluminide, were heated to 2200° F. and 2372° F., respectively, after extrusion. They were aged at 1030° F. The ultimate tensile strengths at 950° F. were 108,000 and 110,000. Metallographic examination showed that grain growth had not taken place in either alloy. Thus, one can heat the products of the present invention to higher solution temperatures by reason of the presence of the dispersed refractory oxide particles.

This application is a continuation-in-part of our copending prior U.S. application Serial No. 93,267, filed March 3, 1961, as a continuation-in-part of our then copending but now abandoned application Serial No. 703,477, filed December 13, 1957, as a continuation-in-part of our then copending but now abandoned application Serial No. 637,746, filed February 1, 1957, as a continuation-in-part of our then copending but now abandoned application Serial No. 595,770, filed July 3, 1956, the said prior application Serial No. 93,267 being also a continuation-in-part of our then copending but now abandoned application Serial No. 6,160, filed February 2, 1960, as a continuation-in-part of our then copending aforesaid application Serial No. 703,477.

We claim:

1. A metal composition having improved high-temperature properties, the composition consisting essentially of (1) a continuous phase of a metal, said metal having a melting point above 600° C. and an oxide with a free energy of formation, ΔF, at 27° C. of from 35 to 103 kilocalories per gram atom of oxygen in the oxide, there being dispersed in said metal phase both (2) from 0.5 to 30% by volume of a discontinuous phase of submicron, refractory metal oxide particles having a ΔF at 1000° C. greater than 99, and (3) from 0.05 to 80% by volume of submicron, precipitated particles of a substance selected from the group consisting of metal carbides, borides, nitrides, silicides, aluminides and titanides and boron nitride and carbide, the oxygen content of the composition in excess of that present in the said refractory oxide particles being less than 0.5% by weight.

2. A composition of claim 1 in which the excess oxygen content is less than 0.1% by weight.

3. A composition of claim 1 in which the proportion of precipitated particles is from 0.5 to 60% by volume.

4. A composition of claim 1 in which the continuous metal phase is at least one metal selected from the group consisting of copper, nickel, cobalt, iron, molybdenum, tungsten, and chromium.

5. A nickel composition having improved high-temperature properties, the composition consisting essentially of (1) a continuous phase of nickel in which there is dispersed (2) about from 2 to 10% by volume of a discontinuous phase of submicron thoria particles, and (3) about from 0.5 to 60% by volume of submicron, precipitated nickel aluminide particles, the oxygen content of the composition in excess of that present in the thoria being less than 0.1% by weight.

6. A copper composition having improved high-temperature properties, the composition consisting essentially of (1) a continuous phase of copper in which there is dispersed (2) about from 2 to 10% by volume of a discontinuous phase of submicron thoria particles, and (3) about from 0.5 to 60% by volume of submicron, precipitated copper aluminide particles, the oxygen content of the composition in excess of that present in the thoria being less than 0.1% by weight.

7. In a process for producing metal compositions having improved high-temperature properties by reason of the presence therein of a dispersion-hardening phase and a precipitation-hardening phase, the steps comprising (1) preparing a dispersion of from 0.5 to 30% by volume of a discontinuous phase of submicron, refractory metal oxide particles having a free energy of formation, ΔF, at 1000° C. greater than 99 kilocalories per gram atom of oxygen in the oxide, said dispersion being in a continuous phase of a metal having a melting point above 600° C. and having an oxide with a ΔF at 27° C. of from 35 to 103, this dispersion being in powder form and having an oxygen content, in excess of that present in said refractory oxide particles, less than 0.5% by weight based on the total ultimate weight of the composition to be produced, (2) mixing the dispersion powder with the components of the precipitate phase to be formed in the metal, the precipitate phase being a substance selected from the group consisting of metal carbides, borides, nitrides, silicides, aluminides and titanides, and boron nitride and carbide, and the proportion of said components being stoichiometrically equivalent to an amount of said precipitate phase which is from 0.05 to 80% by volume of the mixture, (3) heating the mixture to a temperature, $T_1$, higher than the solvus temperature, $T_s$, of the precipitate phase and holding at temperature $T_1$ until all components of the precipitate phase have passed into solution, (4) cooling the solution to a temperature, $T_2$, which is at least 200° C. lower than $T_s$, in less than one-hundred seconds, and (5) aging the so-obtained product at a temperature, $T_a$, which is up to $T_s$ in degrees absolute.

8. A composition of claim 4 in which the submicron, precipitated particles are chromium carbide.

References Cited in the file of this patent
UNITED STATES PATENTS

| | | |
|---|---|---|
| 2,793,949 | Imich | May 28, 1957 |
| 2,823,988 | Grant et al. | Feb. 18, 1958 |
| 2,949,358 | Alexander et al. | Aug. 16, 1960 |